US007324735B2

(12) United States Patent
Harnois

(10) Patent No.: US 7,324,735 B2
(45) Date of Patent: Jan. 29, 2008

(54) IMAGE PROCESSING

(75) Inventor: Stephane Harnois, Laval (CA)

(73) Assignee: Autodesk Canada Co., Montreal, Quebec (CA)

( * ) Notice: Subject to any disclaimer, the term of this patent is extended or adjusted under 35 U.S.C. 154(b) by 1499 days.

(21) Appl. No.: 09/747,455

(22) Filed: Dec. 22, 2000

(65) Prior Publication Data

US 2001/0028779 A1 Oct. 11, 2001

(30) Foreign Application Priority Data

Apr. 6, 2000 (GB) .................................. 0008319.6

(51) Int. Cl.
*H04N 9/00* (2006.01)
*H04N 5/91* (2006.01)
*H04K 1/00* (2006.01)

(52) U.S. Cl. ........................ 386/1; 386/95; 386/96; 386/125; 386/126; 725/90; 725/145; 380/269

(58) Field of Classification Search .................... 386/1, 386/125–126, 46, 52, 96, 45, 83, 85, 95, 386/110, 111; 725/145–146, 115, 90; 714/6; 371/51, 66, 10.1; 380/269; 348/412, 415, 348/715; *H04N 9/00*
See application file for complete search history.

(56) References Cited

U.S. PATENT DOCUMENTS 5,208,813 A * 5/1993 Stallmo ........................ 714/7
5,278,838 A * 1/1994 Ng et al. ...................... 714/6
5,442,390 A * 8/1995 Hooper et al. ................ 725/90
5,452,235 A * 9/1995 Isani ............................ 710/68
5,818,533 A * 10/1998 Auld et al. .............. 375/240.14
6,519,772 B1 * 2/2003 Bopardikar .................. 725/115
6,579,772 B2 * 6/2003 Andoh ......................... 438/328
6,826,778 B2 * 11/2004 Bopardikar et al. ......... 725/145
6,985,589 B2 * 1/2006 Morley et al. ............... 380/269
2003/0206665 A1* 11/2003 Pettigrew ..................... 382/284

* cited by examiner

*Primary Examiner*—John Miller
*Assistant Examiner*—Jamie Jo Vent
(74) *Attorney, Agent, or Firm*—Gates & Cooper LLP

(57) ABSTRACT

An image data processing system is configured to store image data with redundant protection in the form of a redundant array of inexpensive disks (RAID). An input card is configured to receive an input stream of real-time digital video data, possibly provided by a video tape recorder. The video image data is stored and a processor is arranged to perform processing operations upon the stored video data. The input card receives an input stream of real-time video data and the processor performs a first writing operation to write the video data to storage (106) in real-time without parity. The processor then performs a reading operation to read the data from storage and performs a data manipulation (307) upon the data to generate parity information to create protected video data. The processor then performs a second writing operation to write the protected video data back to storage. In this way, RAID calculations are performed after the video data has been capture and as part of other post capture processes including proxy generation and possibly color space conversion.

20 Claims, 6 Drawing Sheets

IMAGE PROCESSING

BACKGROUND OF THE INVENTION

1. Field of the Invention

The present invention relates to an image processing apparatus and a method of processing image data, in which image data is written to storage devices with redundant parity data.

2. Description of the Related Art

The manipulation of video data within a computer processing environment is well known and over recent years the power of computer systems has increased, large random access memory arrays have become competitively priced and it has become possible to provide modestly priced disk storage by using an array of relatively inexpensive disks with the provision of redundant parity information. Computer systems of this type are usually configured to manipulate pixel data represented as red green blue (RGB) samples within operating systems such as OpenGL. Pixel locations within an image frame are addressed such that data transfers may take place and data manipulations may be performed upon video data in a manner substantially similar to the manipulation of all types of data within a computer system.

A problem with manipulating video data in a computer environment is that often the video data is originally sourced from conventional video equipment where images are supplied sequentially in a video stream in real-time to define a raster. Problems therefore arise in terms of converting between these standards. In particular, video devices are configured to operate in real-time therefore it is preferable for a video transfer to continue in real-time once it has been initiated thereby optimising the operation of video equipment.

A solution to this problem is described in British patent number 2 312 319B (U.S. patent application Ser. No. 08/843,282, assigned to the present Assignee). In the disclosed system, purpose-built hardware provides an interface between a video environment and a computer environment and video data stored on a computer system takes the form of RGB data with parity. In addition, if a disk failure occurs, it is possible for the lost data to be regenerated (a process usually referred to as "healing") automatically as data is read from the disks during normal operation. However, if no disk failures occur, the data remains in protected form and no additional measures are required in order to generate parity information.

The need to construct purpose-built hardware can be eliminated if computer systems are provided with appropriate interface cards to facilitate data transfers. A preferred computer system for operating upon high definition digital video is the ONYX 2 produced by Silicon Graphics Inc. This system is now available with a high definition video card therefore it is possible to transfer high definition digital video signals into the computer system in real-time without additional bespoke circuitry. However, problems occur if, in addition to receiving and storing the incoming data, attempts are also made to perform RAID calculations so as to ensure that protected data is written to storage. It is highly undesirable to disrupt the transfer of video information to the computer system therefore a known approach to this problem is to provide purpose-built hardware RAID configurations for writing the information to disk. This introduces two significant disadvantages. Firstly, additional hardware is required thereby again adding to overall system costs. Secondly, hardware RAID systems are relatively inflexible and need to be set-up for a particular type of data storage.

An advantageous approach to performing RAID calculations on the host processor is described in United Kingdom patent number 2 312 316B (U.S. patent application Ser. No. 08/838,738) assigned to the present Assignee. In particular, the size of a particular input frame is assessed and an optimum number of drives is allocated for the striping of data. This approach also facilitates the storage of data at differing definitions, as is often required in image processing systems. In particular, when operating at high bandwidths, it is preferable to store the data at reduced bandwidth in addition to its full bandwidth version as a sequence of images often referred to as "proxies". The provision of these proxies allows manipulations and effects to be perceived in real-time, whereafter similar processes may be performed on the full bandwidth data effectively off-line. Thus, when performing manipulations upon high definition video, it is known to generate proxies at standard video definition (NTSC) and similarly, when processing standard bandwidth video upon less well equipped machines it is known to generate, store and process proxies of reduced bandwidth in both the horizontal and vertical dimension.

BRIEF SUMMARY OF THE INVENTION

According to an aspect of the present invention, there is provided an image processing apparatus configured to store image data with redundant protection, comprising input means configured to receive an input stream of real-time digital video data; storage means for storing image data; and processing means arranged to perform processing operations on said image data, wherein said input means receives an input stream of real-time digital video data; said processing means performs a first writing operation to write said video data to said storage means in real-time without parity; said processing means performs a reading operation to read said data from said storage means, perform a data manipulation upon said video data and generate parity information to create protected video data; and said processing means performs a second writing operation to write said protected video data to said storage means.

BEST MODE FOR CARRYING OUT THE INVENTION

Figure 1:
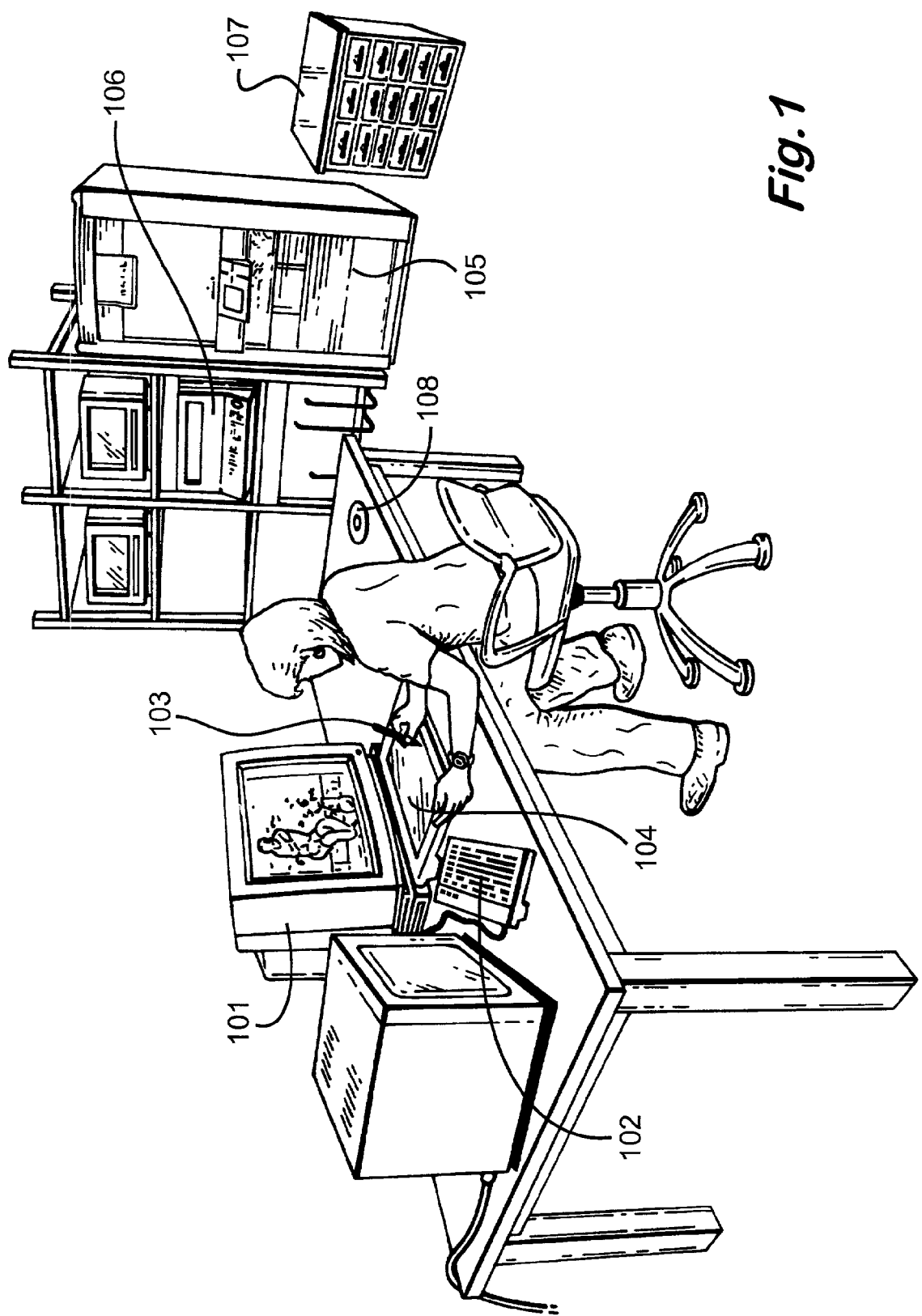
FIG. 1 shows an image processing system.

An image processing system is shown in FIG. 1, in which video images are displayed on a monitor 101 and input commands are generated by an operator via a keyboard 102, a stylus 103 and a touch tablet 104. These devices are interfaced to an Onyx II computer 105. Computer 105 is also interfaced to a high definition digital video recorder 106 and a disk array 107, each configured to convey video material in real-time.

Executable programs may be loaded into the computer 105 from data carrying media such as CD ROM 108. Having loaded executable instructions in this way, the computer 105 is then configured to operate in accordance with the procedures detailed herein.

Figure 2:
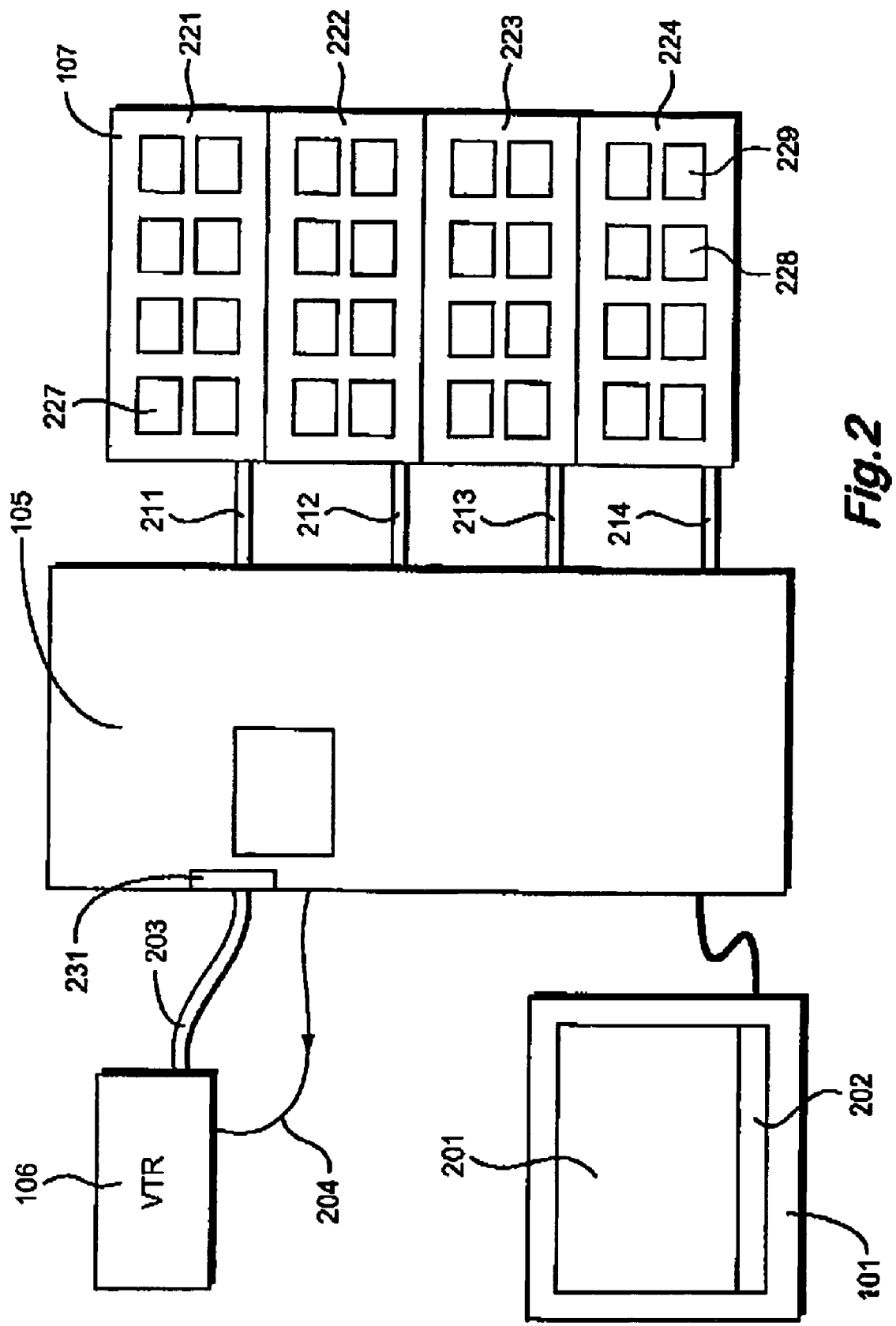
FIG. 2 shows a schematic representation of the system identified in FIG. 1.

The video system identified in FIG. 1 is shown schematically in FIG. 2. High definition video images having 1080 horizontal lines each comprising 1920 pixels are displayable in portion 201 of the visual display unit 101. Visual display unit 101 has a total definition of 1200 lines each comprising 1920 pixels, thereby providing twenty lines at position 202 for the presentation of a graphical user interface to a user of the system. Thus, within region 202, soft buttons and similar graphical items may be displayed which are then selectable in response to operation of stylus/mouse 103. Alternatively, the system may be configured with a stylus and touch table to provide similar positional information. Furthermore, with the provision of these items, the system may also be responsive to gestural movements of the stylus over the touch tablet.

Onyx computer 105 includes a high definition television (HDTV) graphics card which is in turn interfaced to video tape recorder 106 over a conventional HDTV interface cable 203. The video tape recorder 106 is capable of recording and playing back video images at high definition in real-time and an example of such a device is the HDV-F600 produced by Sony corporation of Japan. Operations of VTR 106 are controlled by the computer 105 over a standard serial control interface 204. Thus, in responses to commands generated by computer 105, the video tape recorder 106 is instructed to perform standard operations, such as the playing back of video tape, in order to provide video signals to computer 105 over interface 203.

Computer system 105 includes four independent processors and during the capturing of video data from video tape recorder 106, data received from interface 203 is distributed to these processors in order to provide a smooth flow of data through the system and thereby enabling the system to continue capturing data in real-time; without being required to pause the operations of video tape recorder 106 and without the risk of corrupting data or possibly missing frames of data, as would happen if real-time operation were to fail. Each processor card in turn controls a respective fibre channel interface thereby providing four fibre channel interfaces 211, 212, 213 and 214 communicating with respective disk arrays 221, 222, 223 and 224.

Each disk array, such as array 221, includes eight independently addressable nine gigabyte disk drives, such as disk drive 227. Four independent arrays 221 to 224 each having a respective fibre channel are logically considered as a single array having a total of thirty-two disks 227. Of these, thirty disks are used to store image data, with one of the disks being used to store parity data and the final disk being a spare. The inclusion of a spare disk is important when dealing with a redundant array of inexpensive disks (RAID) because the whole purpose of parity information is to allow lost data to be regenerated when disk failure occurs. Consequently, by including a spare disk, it is possible for this disk to take over from a failed disk and for the regeneration of lost data to be initiated as soon as possible. Thus, in the example shown in FIG. 2, all of disks 227 are used for storing data, with disk 228 being used for storing the parity information and disk 229 being available as a spare.

When storing high definition television signals, the whole of the disk array is used. However, when storing data of lower definition, it is possible to divide the array into a number of partitions and for a particular data transfer to occur to a selected partition. In this way, in addition to the storage of high definition television signals, array 107 is also used for storing reduced definition proxies, having a definition substantially similar to standard television broadcast signals.

Proxy images are generated by filtering the high definition data in a process sometimes referred to as "decimation". The lower bandwidth images are then written to a partition of the array 107 from which they are accessible to the computer system 105. In particular, these proxy images allow manipulations to be performed in real-time, thereby allowing an operator to view an effect prior to a final decision being taken and the operations then being performed in non-real-time upon the high definition material.

It is highly desirable for the video data stored on the disk array 107 to have parity data stored on disk 228, such that the data is protected and any lost data can be reconstituted from a single disk fail. The parity information is generated upon host processors within system 105 under software control therefore it is not necessary for array 107 to include RAID calculation procedures or hardware, thereby reducing its overall cost while at the same time improving flexibility. However, given the requirements for data throughput during video capture, system 105 is not configured to perform RAID calculations while data received from video tape recorder 106 is being written to the storage array 107.

An input card 231 within system 105 receives an input stream of real-time digital video data as luminance plus colour difference signals and converts this to RGB samples, possibly with the orientation of the samples being flipped. System 105 performs a first writing operation to write the video data to the storage array 107 in real-time without generating parity. In this way, the video capturing process is performed smoothly without possible interruption to the video tape recorder 106 and without the possibility of data being corrupted or lost. Thereafter, the processing system 105 performs a reading operation to read the data from the storage array 107 so as to perform further data manipulations upon the video data. In this example, these further manipulations include the generation of reduced bandwidth proxies. In addition, at this stage, parity information is also generated to create protected video data. Thereafter, the processing system 105 performs a second writing operation to write the video data, now in protected form, back to the storage device.

Thus, in order for the data held within the storage array 107 to be in its required format, including the provision of proxies in addition to the high bandwidth signal, it is necessary for the data to be read from the storage array 107, for manipulations to be performed upon it and then for the data to be written back to the storage device 107. The present invention takes advantage of this second processing stage and includes the step of generating parity data during this second stage of processing, in preference to the first stage of data capture. In this way, fully protected data is stored within the array 107 while at the same time RAID calculations do not in any way interrupt the data capturing process.

Figure 3:
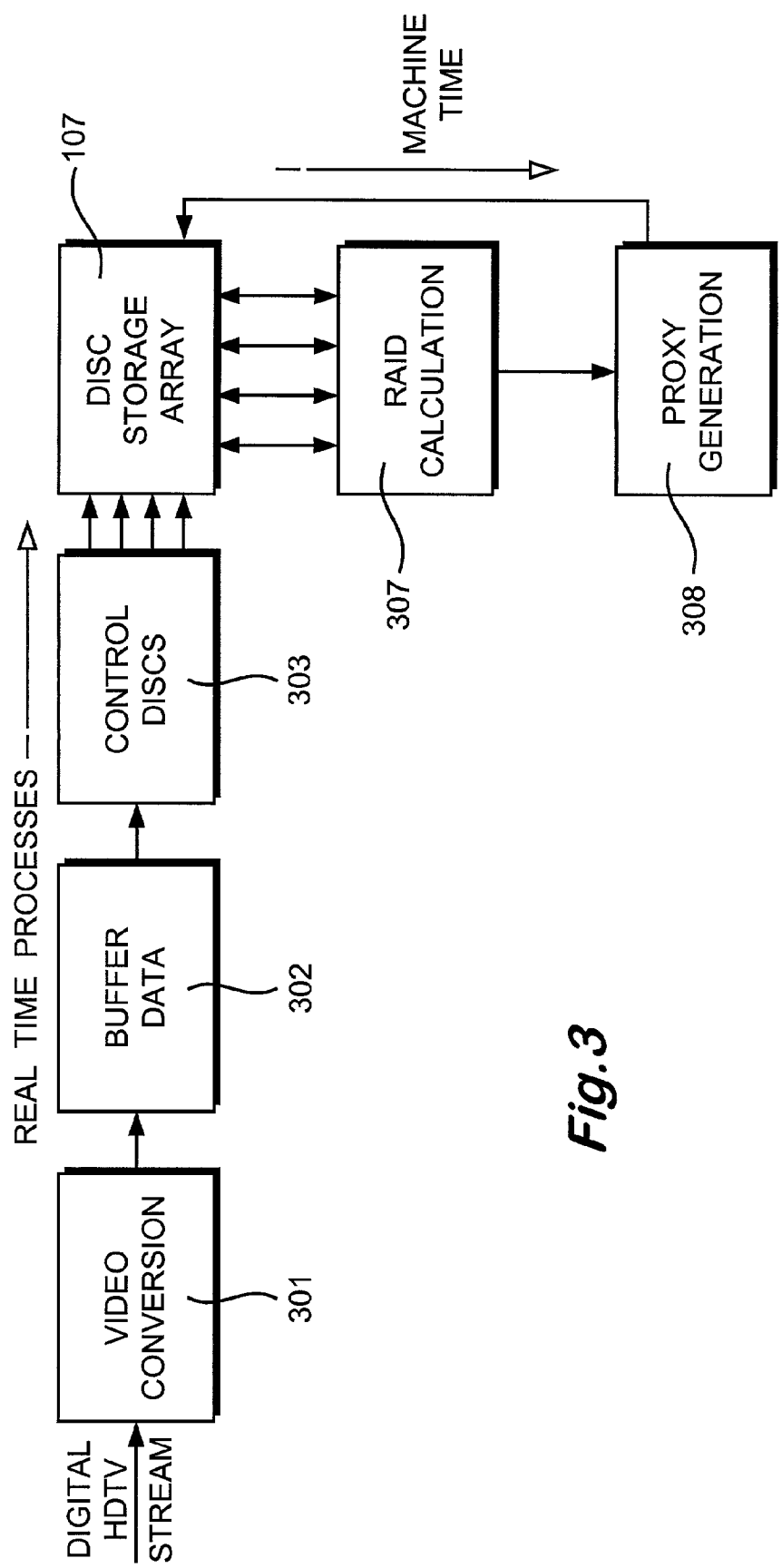
FIG. 3 identifies procedures performed by the system shown in FIG. 2.

Procedures performed by the system of FIG. 2 are detailed in FIG. 3. Processes 301, 302 and 303 are illustrated horizontally and are performed in real-time in response to a real-time video stream received from the video tape recorder 106. Processes 307 and 308 are illustrated vertically and are performed in machine time after the video material has been captured within the disk storage array 107.

The digital HDTV stream from video tape recorder 106 is received by video graphics card 231 which in turn performs a video conversion process 301. This process involves converting luminance plus colour difference samples into three colour RGB samples. In addition, the ordering of the data may be flipped such that a raster scan originating from the top of an image is converted to an addressed frame originating at the bottom of the image, the latter being consistent with OpenGL protocols.

After the video data has been converted by process 301, process 302 buffers the data to local random access memory within the computer system 105. As data is being buffered by process 302 in a revolving manner, process 303 controls the operation of disk storage array 107 and transmits video data over the four fibre channel loops 211 to 214. Thus, processes 301 to 303 continue in real-time until all of the incoming data has been captured within the disk storage array 107.

After the incoming video data has been captured within disk storage array 107, it is then possible for the computer system 105 to perform its non-real-time operation, i.e. in machine-time, in order to ensure that the data has not only been captured and received in real-time but has been processed to ensure that it is has been stored in a preferred way.

At process 307, RAID calculations are performed upon the data by performing an XOR calculation upon thirty stripes of image data on a pixel-by-pixel basis in order to generate an additional parity bit for each corresponding data bit within the image stripes. This additional data is then written to store 228 such that unprotected data originally stored upon thirty disks has been converted to protected data stored over thirty-one disks.

After a RAID calculation has been performed at step 307, proxies are generated at step 308 and these proxies of reduced definition are then written back to a partition of the disk storage array 107.

The procedure of capturing video data and then performing RAID calculations by reading the data and then re-writing the data back to storage has been described with reference to a high definition system using high definition video signals, possibly derived by scanning cinematographic film. The procedure may also be implemented on more modest equipment, such as a Silicon Graphics $O_2$ machine being used for capturing standard broadcast television signals. Machines of this type do not generally include hardware for video to RGB conversion therefore this also is a further process that may be performed in machine-time after the material has been captured.

Figure 4:
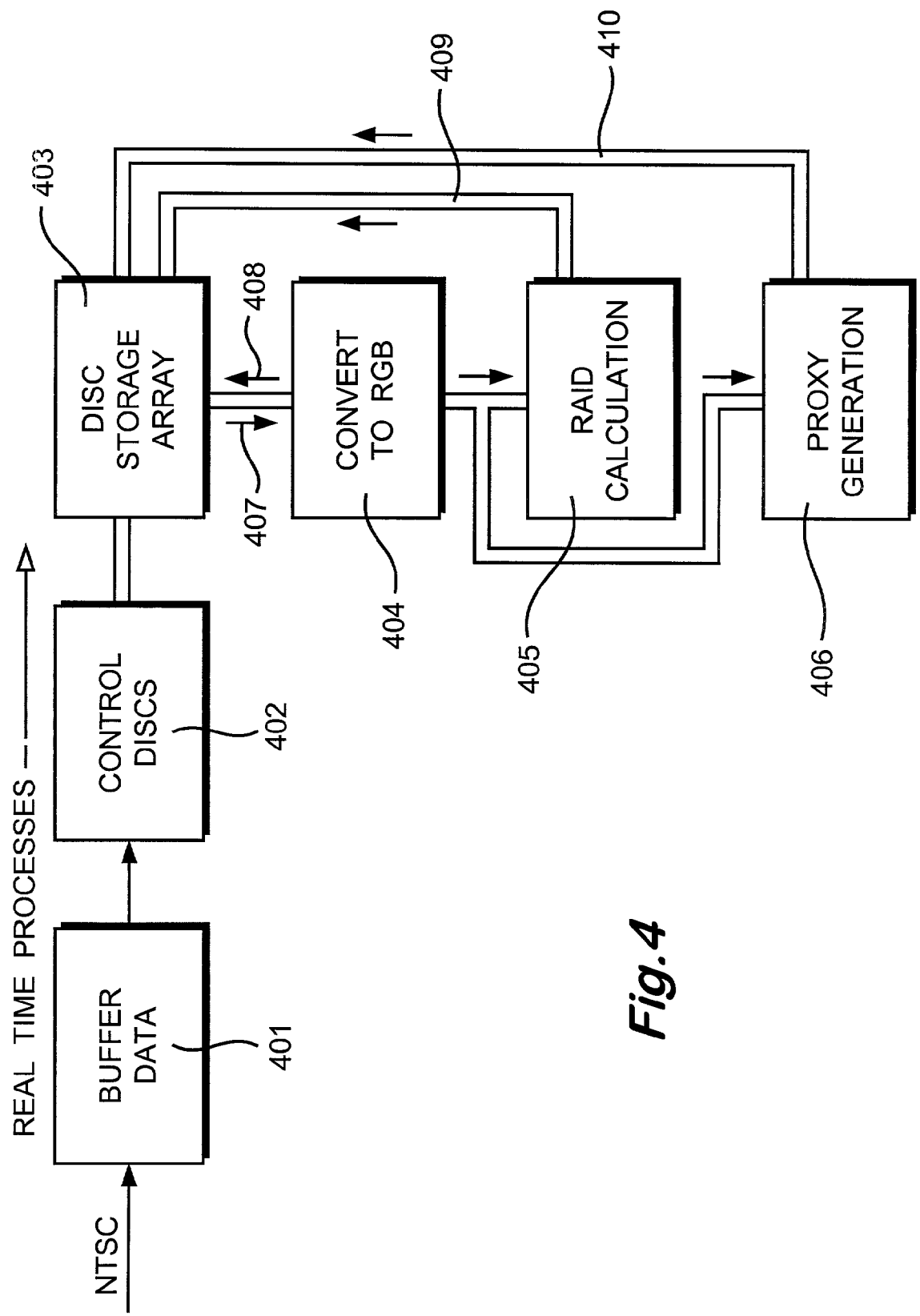
FIG. 4 shows an alternative hardware configuration.

A diagram similar to that shown in FIG. 3 is shown in FIG. 4 and relates to a system substantially similar to that shown in FIG. 2 but where the computer system 105 has been replaced by an $O_2$ system and a video tape recorder 106 is operating at standard broadcast definition. As a consequence of this, the disk array 107 may be reduced from thirty-two disks to typically five disks but again operating as a redundant array.

At process 401 incoming digital NTSC video data is buffered to local storage in a revolving manner. Thus, a plurality of frame buffers are established in local memory such that the operation of disks does not affect the flow of incoming video data in real-time.

At process 402 disks configured over a SCSI array are controlled so as to effect the transfer of data from local storage buffers into a disk storage array 403. Thus, in this way, the video data has been captured in storage array 403 in real-time thereby allowing a video tape recorder 106 to operate normally, while ensuring that no data is lost or corrupted.

After all of the data has been captured by disk storage array 403, a process 404 converts the luminance plus colour difference signals into RGB signals. As previously stated, there is no provision of a video input card within the $O_2$ computer therefore this process must also be performed off-line. The transfer of data from the disk storage array 403 to the conversion process 404 is illustrated by arrow 407. After conversion has taken place, the converted data is written back to the storage array 403, illustrated by arrow 408 and overwrites storage locations occupied by the original input data. In addition to being written to the storage array 403, the converted RGB data is also conveyed to a RAID calculation process 405 configured to calculate the parity data which is then conveyed back to the disk storage array 403, as illustrated by path 409. The converted RGB data from process 404 is also conveyed to a proxy generation process 406 and proxies generated by process 406 are also conveyed back to the disk storage array 403, as illustrated by path 410.

Figure 5:
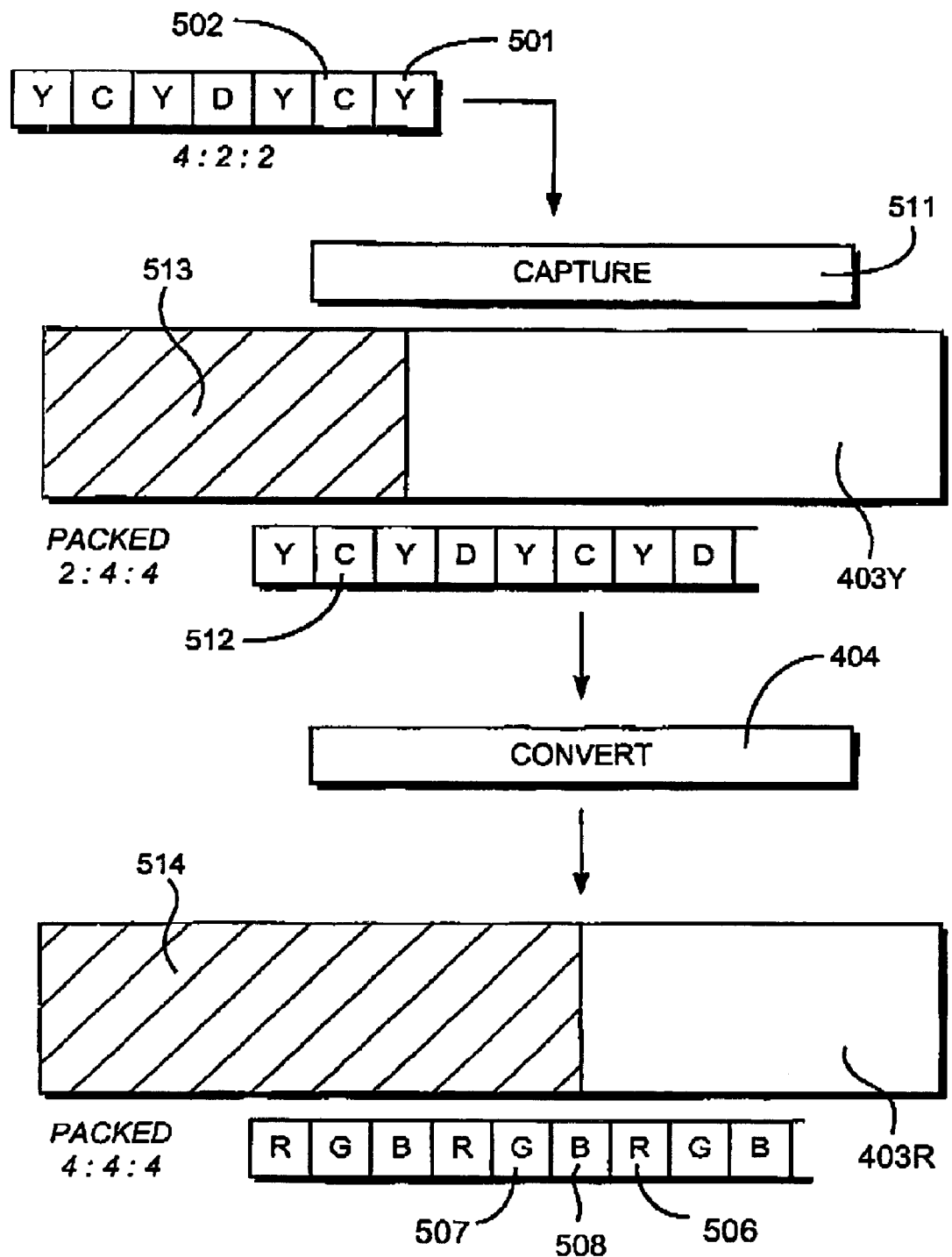
FIG. 5 details capturing and conversion processes as identified in FIG. 4.

Capturing processes and conversion processes identified in FIG. 4 are detailed in FIG. 5. Incoming video data is received as a stream of pixels with each pixel including eight bits 501 of luminance information followed by eight bits 502 of colour difference information. A first byte of colour difference data C is derived by subtracting the luminance signal Y from a red signal. On the subsequent pixel position, luminance data is followed by colour difference information D this time derived by subtracting luminance signal from a blue input. Thus, the data, referred to as 4:2:2 includes a luminance value for each pixel location but has colour difference signals C and D shared over two pixel positions. Thus, each pixel location includes a total of sixteen bits allocated thereto.

After conversion process 404, each pixel location includes eight bits 506 representing a red signal, eight bits 507 representing a green signal and eight bits 508 representing a blue signal. Thus, each pixel location requires a total of twenty-four bits.

Data is overwritten within the disk storage array 403. A disk storage array 403 is illustrated in FIG. 5 as 403Y when captured data and as 403R when storing converted RGB data. Another constraint of the $O_2$ system is that it is not possible to transfer data in real-time at RGB bandwidth, but it possible to convey video data in real-time for 4:2:2 bandwidth. Consequently, during the capturing process, the data is written in packet 2:4:4 form as illustrated at 512. 403Y represents the total volume of the storage space and after a capturing operation shaded portion 513, in this example, has received the captured video.

During conversion process 404, two pixels containing four samples are expanded to two equivalent pixels containing three samples, as illustrated by samples 506, 507 and 508. This results in the total space contained within disk 403R being expanded to shaded region 514. In this way, it is possible to capture the data in real-time without requiring full RGB bandwidth to the disk during the writing operation. Conversion process 404 to RGB also results in an expansion of the total amount of disk space addressed for the storage of the data.

Thus, after conversion process 404, sufficient space is available for eight bytes of red data, eight bytes of green data and eight bytes of blue data to be held within the same storage locations. Thus, for each two bytes 501, 502 of real-time video data captured by the system, three bytes 506, 507 and 508 are stored after conversion to RGB. In the high definition system shown in FIG. 3, this conversion is performed by the input card and immediately written to disk in RGB form. In the low definition system illustrated with respect to FIG. 4, it is not possible to perform this conversion as the data is received therefore the process is performed as part of the data manipulation carried out between reading the data and then writing it for a second time. Consequently, given that the original data is overwritten in the low definition system, it is necessary to ensure that space is provided for this additional data during the capturing process, as illustrated in FIG. 5.

Figure 6:
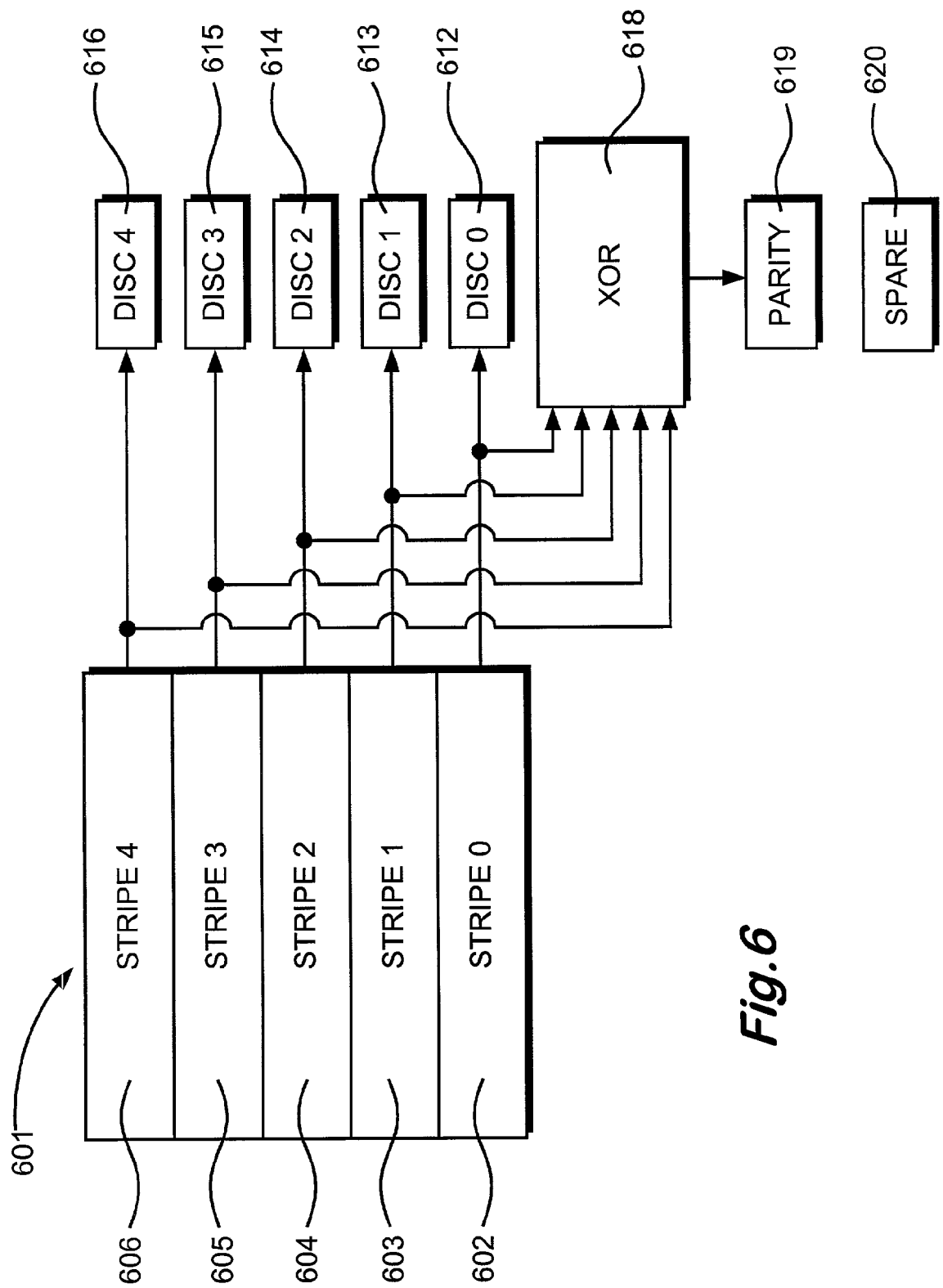
FIG. 6 details a process for the calculation of RAID data, identified in FIG. 4.

Process 405 for the calculation of RAID data is illustrated in FIG. 6. In this low definition system, an image frame 601 is divided into five stripes 602, 603, 604, 605 and 606. In the high definition system illustrated in FIG. 3, a similar striping process is performed with the image frame being divided into thirty stripes. After being buffered at process 401, stripes are effectively read in parallel such that each stripe may be considered as reading the image, with a predetermined off-set defining the stripe position.

Transfer to disk occurs over a serial SCSI interface, with five of the SCSI channels being employed to effect transfer to a respective disks 612, 613, 614, 615, 616 for each of the video stripes. In addition, outputs from the video stripes are supplied to an XOR process 618. Within each stripe, pixels have similar addresses but with increments of stripe off-sets. Thus, a particular pixel in stripe zero has a corresponding pixel in stripe one, which has a corresponding pixel in stripe two, a corresponding pixel in stripe three and a corresponding pixel in stripe four. Similarly, the pixels made up of twenty-four bits, as illustrated in FIG. 5, have corresponding bits derived from each stripe. These corresponding bits for each stripe are XORd in order to provide data which is supplied to a parity disk 619. If any of disks 612 to 616 or parity disk 619 fails, it is replaced by spare disk 620. Outputs from all of the remaining disks are XORd in order to regenerate the lost data which is then written to the spare disk 620, which may then logically take its place within the disk array.

The redundant parity data written to disk 619 is calculated after the data has been read from storage 303 and forms part of a manipulation being performed on the data before the protected data is then written back to storage under a second writing step. In the high definition system, the manipulation includes a generation of proxy data and in the lower definition system the manipulation also includes a conversion to RGB. In this way, protected data is generated without undermining the real-time capture process.

Many techniques are known for the generation of proxies which, in its simplest form, merely involves the selection of some pixels in preference to other pixels on a regular basis with a minimal degree of filtering. In more sophisticated systems, two dimensional filtering is produced, which, for example, may generate a single pixel by averaging four on more adjacent pixels. In the majority of applications, the sophistication of process 406 or process 308 will depend upon the sophistication of processes requiring this proxy information. It should be understood that the manipulation of proxy information merely provides an operator with an indication of a particular effect and that the final effect is performed on the full definition data.

What we claim is:

1. Image processing apparatus configured to store image data with redundant protection, comprising
    input means configured to receive an input stream of real-time digital video data;
    storage array means for storing image data in an array of disks; and
    processing means arranged to perform processing operations upon said image data, wherein
    said input means receives an input stream of real-time digital video data;
    said processing means performs a first writing operation to write said video data to said storage array means in real-time without RAID calculations and without parity;
    said processing means performs a reading operation to read said data from said storage array means, perform a data manipulation upon said video data and generate parity information to create protected video data; and
    said processing means performs a second writing operation to write said protected video data to said storage array means.

2. Apparatus according to claim 1, wherein said real-time digital data represents high definition images defined by luminance samples and colour difference samples.

3. Apparatus according to claim 1, wherein said high definition digital video data is derived by scanning cinematographic film.

4. Apparatus according to claim 1, wherein said real-time digital video data represents standard broadcast television images defined by luminance and colour difference signals.

5. Apparatus according to claim 2, wherein said luminance samples and said colour difference samples are converted to three colour samples before performing said writing step.

6. Apparatus according to claim 4, wherein said data manipulation step includes converting luminance plus colour difference signals into three colour samples.

7. Apparatus according to claim 1, wherein said data manipulation step includes generating reduced bandwidth proxy images and writing said proxy images to said storage array.

8. A method of processing image data to provide redundant protection, comprising the steps of
    receiving an input stream of real-time digital video data;
    performing a first writing step to write said video data to a disk storage array without RAID calculations and without parity in real-time to implement a video capture;
    reading said video data from said disk storage array;
    performing a data manipulation upon said data read from said disk storage array;
    calculating redundant parity data to generate protected image data; and
    performing a second writing step to write said protected image data to said disk storage array.

9. A method according to claim 8, wherein said real-time digital data represents high definition images represented by luminance samples and colour different samples.

10. A method according to claim 9, wherein said high definition digital video data is derived by scanning cinematographic film.

11. A method according to claim 8, wherein said real-time digital video data represents standard broadcast television images represented by luminance and colour difference signals.

12. A method according to claim 8, wherein said luminance samples and said colour difference samples are converted to three colour (RGB) samples before performing said writing step.

13. A method according to claim 8, wherein said data manipulation step includes converting luminance plus colour difference signals into three colour (RGB) samples.

14. A method according to claim 8, wherein said data manipulation step includes generating reduced bandwidth proxy images and writing said proxy images to said disk storage array.

15. A computer-readable medium having computer-readable instructions executable by a computer such that, when executing said instructions, a computer will perform the steps of:
receiving an input stream of real-time digital video data;
performing a first writing step to write said video data to a disk storage array without RAID calculations and without parity in real time to implement a video capture;
reading said video data from said disk storage array;
performing a data manipulation upon said data read from said disk storage array;
calculating redundant parity data to generate protected image data; and
performing a second writing step to write said protected image data to said disk storage array.

16. A computer-readable medium having computer-readable instructions according to claim 15, such that when executing said instructions, a computer will also perform the step of converting samples representing luminance and colour difference to three colour (RGB) samples before performing said first writing step.

17. A computer-readable medium having computer-readable instructions according to claim 15, such that when executing said instructions, a computer will also perform the step of converting luminance plus colour difference signals into three colour (RGB) samples during said data manipulation step.

18. A computer-readable medium having computer-readable instructions according to claim 15, such that when executing said instructions, a computer will also perform the steps of generating reduced bandwidth proxy images and writing said proxy images to said disk storage array during said data manipulation step.

19. A computer system programmed to execute stored instructions such that in response to said stored instructions said system is configured to:
receive an input stream of real-time digital video data;
perform a first writing step to write said video data to disk storage without parity in real-time to implement a video capture;
read said video data from storage;
perform a data manipulation upon said data read from storage;
calculate redundant parity data to generate protected image data; and
perform a second write step to write said protected image data to storage.

20. A computer system programmed to execute stored instructions according to claim 19, wherein said data manipulation process generates reduced bandwidth proxy images and write said proxy images to storage.

* * * * *